(12) United States Patent
Hashizume et al.

(10) Patent No.: US 9,070,400 B2
(45) Date of Patent: Jun. 30, 2015

(54) METHOD OF MANUFACTURING A MAGNETIC RECORDING MEDIUM

(75) Inventors: Yuichi Hashizume, Nagano (JP); Kunio Hibino, Nagano (JP)

(73) Assignee: FUJI ELECTRIC CO., LTD., Kawasaki-shi (JP)

( * ) Notice: Subject to any disclaimer, the term of this patent is extended or adjusted under 35 U.S.C. 154(b) by 661 days.

(21) Appl. No.: 12/821,104

(22) Filed: Jun. 22, 2010

(65) Prior Publication Data

US 2010/0330270 A1 Dec. 30, 2010

(30) Foreign Application Priority Data

Jun. 23, 2009 (JP) .................................. 2009-148760

(51) Int. Cl.
*G11B 5/855* (2006.01)

(52) U.S. Cl.
CPC ........................................ *G11B 5/855* (2013.01)

(58) Field of Classification Search
USPC ............... 427/425, 416, 409; 118/52–55, 320
See application file for complete search history.

(56) References Cited

U.S. PATENT DOCUMENTS

| | | | | |
|---|---|---|---|---|
| 3,730,760 | A * | 5/1973 | Machmiller | 427/209 |
| 4,033,288 | A * | 7/1977 | Woellhaf et al. | 118/52 |
| 5,980,985 | A * | 11/1999 | Kikuchi | 427/240 |
| 6,740,163 | B1 * | 5/2004 | Curtiss et al. | 118/423 |
| 2001/0052320 | A1 | 12/2001 | Komaki et al. | |
| 2004/0096618 | A1 * | 5/2004 | Komaki et al. | 428/64.4 |
| 2005/0284320 | A1 | 12/2005 | Sakuarai et al. | |
| 2008/0093755 | A1 * | 4/2008 | Nishimura et al. | 264/1.33 |
| 2010/0196596 | A1 | 8/2010 | Hirose et al. | |
| 2011/0027478 | A1 | 2/2011 | Fukushima et al. | |

FOREIGN PATENT DOCUMENTS

| | | |
|---|---|---|
| JP | 63-076113 A | 4/1988 |
| JP | 63-209027 A | 8/1988 |
| JP | 10-320850 A | 12/1998 |
| JP | 11-213459 A | 8/1999 |
| JP | 2001-351275 A | 12/2001 |
| JP | 2005-108351 A | 4/2005 |
| JP | 2008-114379 A | 5/2008 |
| JP | 2009-070507 A | 4/2009 |
| JP | 2009-245513 A | 10/2009 |

OTHER PUBLICATIONS

Foreign Office Action issued on Aug. 31, 2012 with English translation.

* cited by examiner

*Primary Examiner* — Mandy Louie
(74) *Attorney, Agent, or Firm* — Rabin & Berdo, P.C.

(57) ABSTRACT

A method of manufacturing a magnetic recording medium includes providing a substrate that is a magnetic recording medium substrate having a disc shape, having two main surfaces, and having defined therein a center hole; holding the center hole of the substrate from both main surfaces with two holding members that each have a disc shape to hold the substrate and to cover at least the periphery of the center hole adjacent to the two main surfaces of the substrate; and applying resist liquid simultaneously to both main surfaces of the substrate using spin coating to form a resist layer simultaneously on both main surfaces while maintaining the periphery of the center hole immediately adjacent to the two main surfaces of the substrate resist-free as an unapplied portion. The method enables efficient formation of uniform resist layers without defects on both faces of the substrate.

19 Claims, 6 Drawing Sheets

METHOD OF MANUFACTURING A MAGNETIC RECORDING MEDIUM

CROSS-REFERENCE TO RELATED APPLICATION

This non-provisional Application claims the benefit of the priority of Applicants' earlier filed Japanese Patent Application Laid-open No. 2009-148760 filed Jun. 23, 2009, the entire contents of which are incorporated herein by reference.

BACKGROUND OF THE INVENTION

1. Field of the Invention

The present invention relates to a method of manufacturing a magnetic recording medium. More precisely, this invention relates to a method of manufacturing a magnetic recording medium that includes an application process of forming, using a spin coating method, a resist layer on the surface of the magnetic recording medium substrate to perform pattern formation.

2. Description of the Related Art

There has been a trend toward increasing capacity for hard disk drives in recent years, necessitating correspondingly rising recording densities for magnetic recording medium. Together with increased recording densities, increases in the track density have been accompanied by unwanted recording, called side fringes, in regions between adjacent tracks due to a leakage magnetic field occurring from the side faces of the head gap during data writing. These side fringes are a source of noise and cause a decline in the reproduced signal S/N ratio.

In order to avoid such difficulties, proposals have been made relating to a discrete track-type magnetic recording medium, in which grooves are provided between adjacent recording tracks (see, for example, Japanese Patent Application Laid-open No. 2005-108351). In a magnetic recording medium of this discrete track type, by providing grooves between adjacent tracks, the tracks are separated, and so the above-described difficulty of side fringes can be avoided.

On the other hand, in order to attain still higher recording densities, a patterned medium has also been disclosed, in which dots are formed on the disc so as to each become one bit.

The discrete track medium and patterned medium both entail formation of a fine pattern on a disc, and this patterning is often performed using an imprinting method.

In this imprinting method, a mold in molding face on which a fine pattern is formed is used as an original mold, and the fine pattern is transferred onto the surface of a substrate onto which a resist liquid is applied; then, appropriate etching is performed using the fine pattern (resist pattern) transferred onto the resist face, to process the medium surface.

As the method used to apply the resist liquid, a spin coating method is known and is widely used in semiconductor manufacturing.

In the spin coating method, while rotating the substrate rapidly, a photohardening resist, thermoplastic resist, or other resist material in liquid form (hereafter called a resist liquid) is dripped onto the substrate, so that the resist liquid is uniformly spread across and applied to the entire surface of the substrate.

As the magnetic recording medium for large-capacity hard disk drives, normally a disc-shaped magnetic recording medium with magnetic recording performed on both faces is used.

Hence, in manufacturing a magnetic recording medium having a pattern on the surface, it is necessary to process both faces. However, patterns required for a magnetic recording medium have a precision on the order of several tens of nanometers, and preexisting spin coating methods are widely being studied as methods for forming resist layers appropriate for processing with such high precision.

In order to uniformly apply a resin (resist liquid) to a substrate using a spin coating method, the liquid must be dripped onto the center of the substrate, but a center hole is normally formed in the center of the substrate of a magnetic recording medium, and this hole portion impedes the spreading of resin and complicates formation of a film with uniform film thickness. Hence methods are used in which the hole portion at the substrate center is avoided when supplying resin to cause rotation spreading. Further, as a method of supplying resin to one face of the substrate without avoiding the hole portion at the substrate center, methods have been disclosed in which the center portion is covered (see, for example, Japanese Patent Application Laid-open No. 10-320850 and Japanese Patent Application Laid-open No. 11-213459).

In conventional spin coating methods, the rear face of the substrate is held and the resist liquid is applied to the surface to form a resist layer. In the case of a magnetic recording medium, both faces are processed, and so when a pattern is formed on one face at a time, the resist liquid is applied to one face of the disc-shaped substrate having a center hole in the center as described above, and imprinting and etching are performed; but in order to form patterns on both faces, at least twice the manufacturing time is required and, thus, efficiency is greatly reduced.

Further, when processing one face at a time, the rear face is affected during each of the spin coating, imprinting, and etching processes. As a result, media manufacture with the same quality for both faces is difficult.

That is, in forming a resist layer using spin coating, when the resist liquid is applied to the substrate surface, the resist liquid flows around to the rear face of the substrate, and in this state affects the resist application to the rear face, so that there is the problem that uniform application is not possible.

Further, resist which has flowed around to the rear face of the substrate is easily removed from the substrate, become particles which adhere to the substrate, and becoming a cause of defects and unevenness.

Also, when a resist layer is formed on one face at a time, and imprinting and etching processing are performed simultaneously on both faces, the time from application of resist liquid until processing is different for the two faces, so that the amount of solvent remaining in the resist liquid applied to the substrate's surface (front face) and the amount of solvent remaining in the resist liquid applied to the substrate's rear face are different. Consequently, the viscosity of the resist liquid applied is different on the substrate surface and rear face, and if imprinting is performed simultaneously on both faces of the substrate, differences occur in the pattern shapes transferred to the surface and to the rear face, and the transfer is impaired and may be defective.

In methods of covering the center hole portion of a conventional substrate, the resist liquid easily adheres to the cover after resist liquid application and, when the cover is removed from the substrate, the resist liquid easily adheres once again to the unapplied portion on the inside periphery, and moreover flash (unintended excess portions) readily occur where the resist layer is formed by application.

Resist adhering to the peripheral portions of the center hole that were not intended for resist application (unapplied portions) peels away when the substrate is fastened at the inner periphery, becoming particles and causing defects.

On the other hand, if imprinting is performed with flash remaining on the resist layer, not only is uniform imprinting not possible, but pressure is concentrated at the portions in contact and the mold used for imprinting is deformed so that the mold may be degraded.

Also, in methods of the prior art in which the substrate is held by an inner-periphery chuck used in processes to manufacture a magnetic recording medium, the resist liquid flows around the chuck portion and adheres when the resist liquid is applied, so that the difficulty of occurrence of particles during substrate transport occurs.

SUMMARY OF THE INVENTION

This invention is proposed in light of the above actual state of the prior art, and has the object of providing a method of manufacturing a magnetic recording medium, enabling efficient formation of a uniform resist layer without defects on both faces of a disc-shaped magnetic recording medium substrate having a center hole in the center.

This object is accomplished by providing a method of manufacturing a magnetic recording medium, comprising the steps of: providing a substrate that is a magnetic recording medium substrate having a disc shape, having two main surfaces, and having defined therein a center hole; holding the center hole of the substrate from both main surfaces with two holding members that each have a disc shape to hold the substrate and to cover at least the periphery of the center hole adjacent to the two main surfaces of the substrate; and applying resist liquid simultaneously to both main surfaces of the substrate using spin coating to form a resist layer simultaneously on both main surfaces while maintaining the periphery of the center hole immediately adjacent to the two main surfaces of the substrate resist-free as an unapplied portion.

By means of the method of manufacturing a magnetic recording medium of this invention, by holding the resist-free, unapplied portion on the center hole portion periphery during taking-in, holding, and removing-from a processing device in each of the processes of manufacturing a magnetic recording medium, the occurrence of particles due to resist peeling and the like can be prevented, and consequently defects and the occurrence of unevenness can be prevented, and a magnetic recording medium having a resist layer which is uniform and without defects on both faces of the magnetic recording medium substrate can be efficiently manufactured.

DETAILED DESCRIPTION OF THE INVENTION

Below, preferred embodiments of the invention are explained in detail, referring to the drawings.

Figure 10:
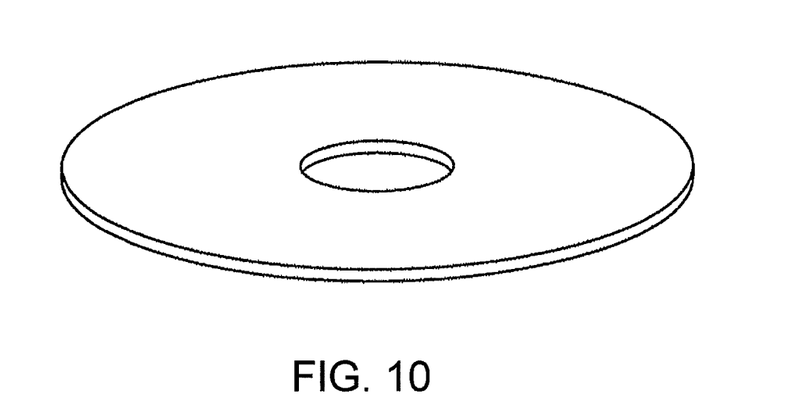
FIG. 10 is a perspective view of a magnetic recording medium.

A magnetic recording medium to which this invention is applied is a magnetic recording medium in which is formed a magnetic layer having a fine relief pattern corresponding to information signals, and having a center hole, i.e., an inner hole in the center, as shown in FIG. 10.

In this invention, the magnetic recording medium substrate employed in the application process has at least a magnetic layer formed on the surface of a nonmagnetic substrate, and has a center hole.

An example of such a magnetic recording medium substrate has, for example, on a nonmagnetic substrate, a soft magnetic layer, a seed layer, an intermediate layer, a magnetic layer, and a protective layer, in this order.

As this nonmagnetic substrate, any arbitrary nonmagnetic material used in the prior art in manufacturing a magnetic recording medium can be employed. For example, a substrate manufactured using glass, an Ni—P plated aluminum alloy, silicon, or a similar material can be used.

The soft magnetic layer comprises a soft magnetic material comprising at least one among Co, Ni, and Fe, and can be formed using, for example, a crystalline material, such as FeTaC, Sendust (FeSiAl) alloy, or the like; a microcrystalline material, such as FeTaC, CoFeNi, CoNiP, or the like, or an amorphous material comprising a Co alloy, such as CoZrNd, CoZrNb, CoTaZr, and the like. The soft magnetic layer has the function of causing the perpendicular-direction magnetic field generated by the magnetic head to be concentrated in the magnetic recording layer in a perpendicular magnetic recording medium. The optimum value for the film thickness of the soft magnetic layer varies depending on the structure and characteristics of the magnetic head used for recording, but when also considering producibility, a thickness of approximately 5 to 100 nm is desirable.

The seed layer is a crystalline layer which controls the crystal orientation of the Ru or the like of the intermediate layer, and can be formed using a Permalloy system material, such as NiFeAl, NiFeSi, NiFeNb, NiFeB, NiFeNbB, NiFeMo, NiFeCr, or the like; a Permalloy system material with Co further added, such as CoNiFe, CoNiFeSi, CoNiFeB, CoNiFeNb, and the like; Co; or a Co-based alloy, such as CoB, CoSi, CoNi, CoFe, and the like. It is desirable that the seed layer have a film thickness sufficient to control the crystal structure of the magnetic recording layer. In normal cases, it is desirable that a sputtering method be used in film deposition to a thickness of 10 nm or less.

The intermediate layer is a layer which controls the domain orientation of the magnetic recording layer, and for this purpose the crystal orientation thereof is controlled by the seed layer. This intermediate layer can be formed using Ru or using an alloy the main component of which is Ru. The intermediate layer is a layer having a thickness of 1 to 10 nm and is deposited by a sputtering method or the like. By choosing such a film thickness, characteristics necessary for high-density recording can be imparted to the magnetic recording layer, without causing degradation of the magnetic characteristics or the electromagnetic transducing characteristics of the magnetic recording layer.

The magnetic layer is a layer which has magnetic domains oriented and serves as the magnetic recording layer, and can preferably be formed using a ferromagnetic alloy material comprising at least Co and Pt. The easy axis of magnetization of the ferromagnetic material must be aligned along the direction of magnetic recording. For example, when performing perpendicular magnetic recording, the easy axis of magnetization of the material of the magnetic recording layer (the c axis in the hexagonal close-packed (hcp) structure) must be aligned in the direction perpendicular to the recording medium surface (that is, the main plane of the medium). The magnetic layer can, for example, be formed using CoPt, CoCrPt, CoCrPtB, CoCrPtTa, or another alloy material. No limitations in particular are placed on the film thickness of the magnetic layer. However, from the standpoint of improving production efficiency, i.e., producibility, and recording density, the magnetic layer generally has a film thickness of from 5 to 50 nm and is deposited by a sputtering method or the like. As used below, a magnetic recording medium with at least a magnetic layer formed on the surface is called a magnetic recording medium substrate.

Figure 1:
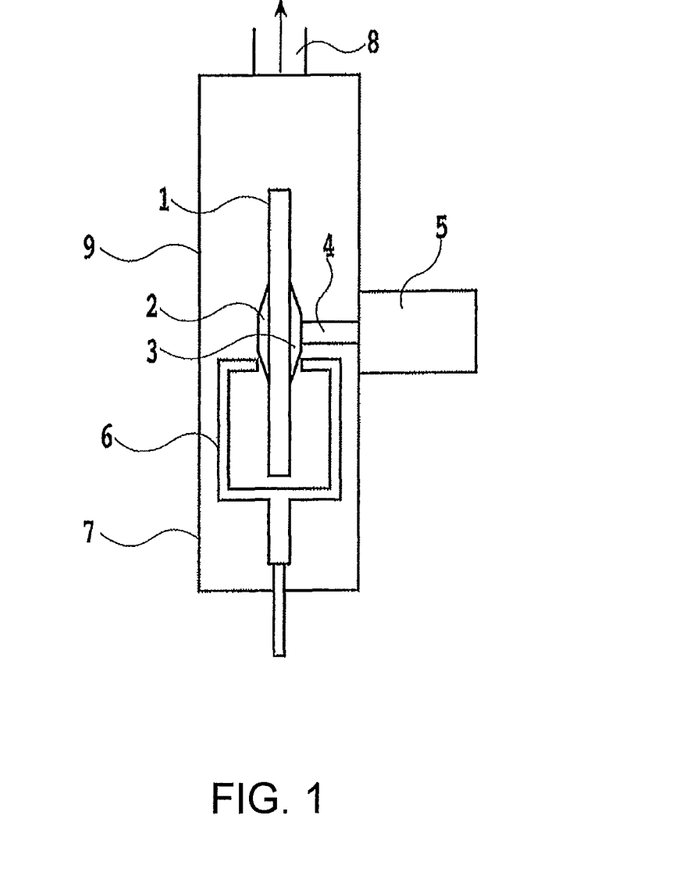
FIG. 1 is a summary view showing an example of a spin coating device used in an application process, in the method of manufacturing a magnetic recording medium of this invention.

FIG. 1 is a summary view of a spin coating device used in the invention. In the figure, the magnetic recording medium substrate 1 is sandwiched between disc-shaped holding members 2 and 3 and is held thereby. The two holding members 2, 3 are formed from a material having water-repellent properties. The two holding members 2, 3 each have a tapered shape, in which a center portion is thick, i.e., the face in contact with the magnetic recording medium through to the opposite face has a thickness that is thick, and the thickness gradually decreases, i.e., tapers down, moving toward the outside circumference. The holding member 3 is in contact with the driving portion 5 via engagement with a rotation shaft 4 of the spin coating device that shares the same axis as the holding member 3. The axis of the holding members serves as the substrate's axis of rotation.

Here, "material having water-repellent properties" means material such that, when water is dripped onto the surface of the material, the contact angle of the water is 80° or greater. The material with water-repellent properties preferably has a water contact angle of 90° or greater. If the water contact angle is less than 80°, the resist liquid readily penetrates into the inner-periphery of holding members 2 and 3, and, as a result, from there it can flow into the center hole of the substrate so that it can easily become difficult to maintain a resist-free, unapplied portion of the substrate 1.

Figure 2:
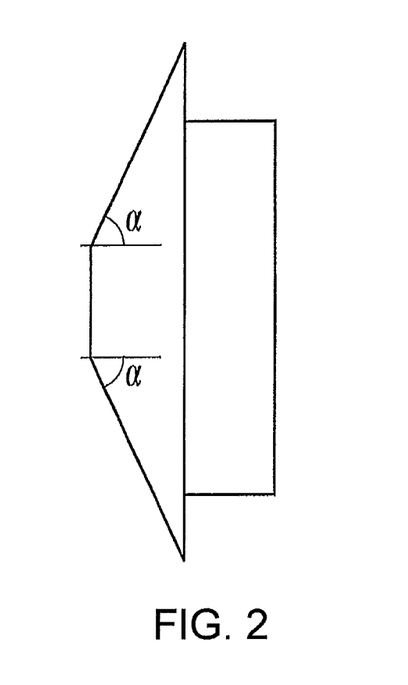
FIG. 2 is a cross-sectional view showing one example of the cover of a holding member which holds a magnetic recording medium, in the method of manufacturing a magnetic recording medium of this invention.

Further, it is preferable that the tapered shape of the holding members 2 and 3 be of a shape such that the taper angle α of a cover section of the holding member be 10° or greater and less than 90°, as for example shown in FIG. 2. If the taper angle is less than 10°, spreading of the resist liquid which is directed onto the holding member is insufficient, and the resist layer on the magnetic recording medium surface tends to become uneven.

The holding members 2 and 3 engage and hold the magnetic recording medium substrate 1 to cover at least the periphery 1a of the center hole adjacent to the two main surfaces of the substrate 1 by detachably mating at the rotation shaft portion 4. That is, on the sides of the holding members 2 and 3 facing the magnetic recording medium substrate 1, the outer periphery of one among the holding members 2 and 3 has a protrusion having an outer periphery which can close the center hole of the magnetic recording medium substrate and, moreover, in the center portion of the protrusion has a depression portion which can mate with a protrusion in the other holding member.

Figure 4:
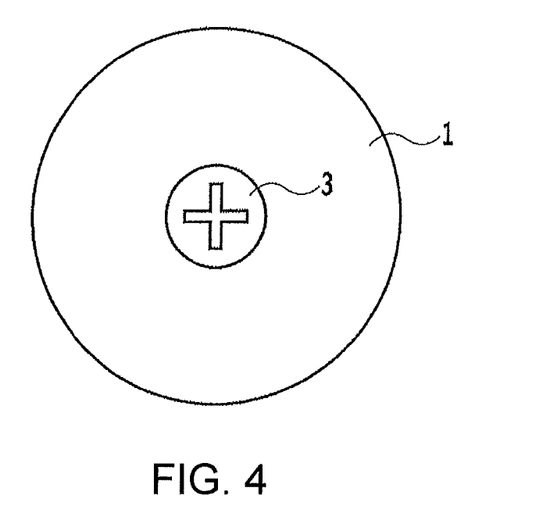
FIG. 4 shows an example of the mating portions of the holding members 2 and 3.
Figure 5:
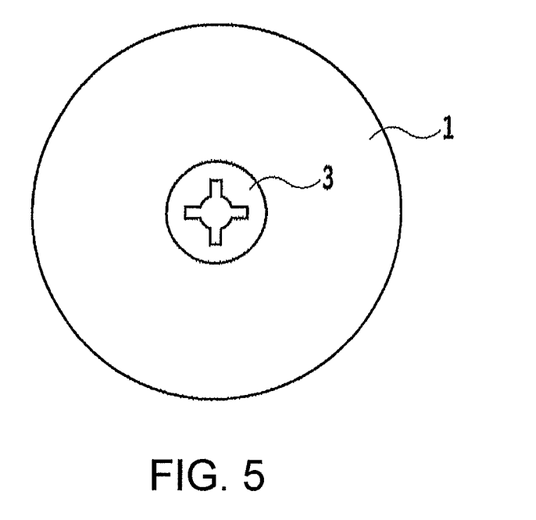
FIG. 5 shows another example of the mating portions of the holding members 2 and 3.
Figure 6:
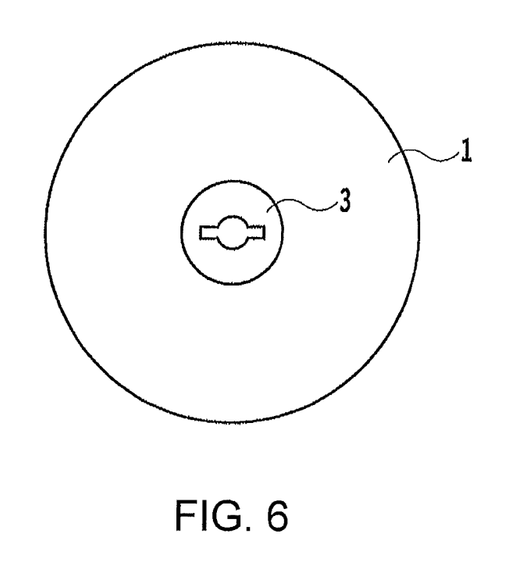
FIG. 6 shows another example of the mating portions of the holding members 2 and 3.

FIG. 4 through FIG. 6 show examples of the shape of the mating portion, but the shape is not limited to these cross-sectional shapes, and any shape may be used so long as, when one among the holding members 2 and 3 rotates, the other holding member does not slide with respect to the one holding member, and the other holding member rotates in synchronization via the mating portion.

Figure 3:
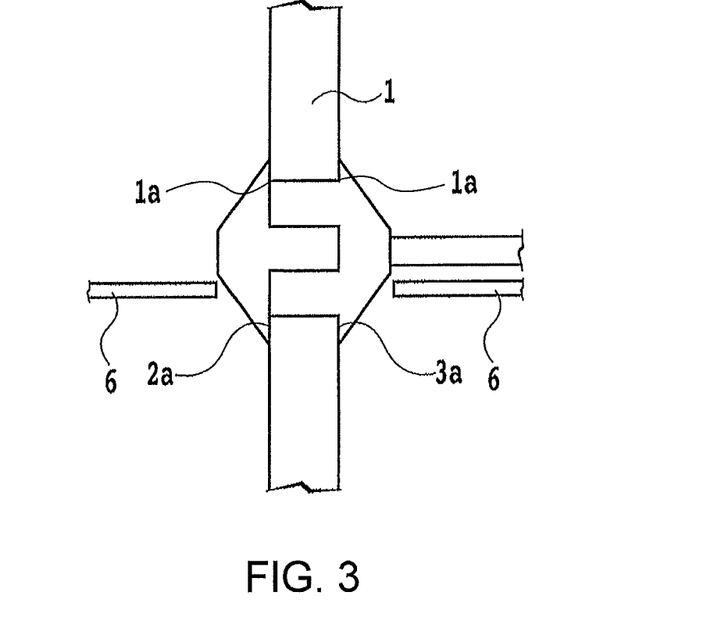
FIG. 3 is an enlarged cross-sectional view showing a portion of the spin coating device of FIG. 1.

As shown in FIGS. 1 and 3, the magnetic recording medium substrate 1 is held vertically, i.e., in the vertical direction, and is rotated by means of the rotation shaft 4 of the driving portion 5. The resist liquid is conveyed by a supply device (not shown) and is dispensed from two nozzles 6 positioned in directions substantially perpendicular to the magnetic recording medium substrate 1, i.e., horizontally, to apply resist liquid onto the surfaces of the magnetic recording medium substrate 1 simultaneously. In FIG. 1, the tips of the nozzles 6 are installed and directed at the surfaces of the holding members 2 and 3, and due to rotation of the magnetic recording medium substrate 1, the resist liquid spreads circumferentially, i.e., in the circumferential direction, and uniform application to both of the entire exposed faces of the magnetic recording medium substrate 1 is possible. By means of a driving device (not shown), nozzles 6 can be moved in the horizontal direction. The entirety is covered by a case 7, and evacuation is from an evacuation outlet 8.

As the resist liquid, use can be made of resins such as an ultraviolet ray hardening resin which is an acrylic system resin as a main component, a thermosetting resin, or a thermosetting-type resin, or other resin material, and a SOG (Spin On Glass).

Practical Examples

Below, practical examples are used to explain methods of manufacturing a magnetic recording medium of this invention still more specifically.

Practical Example 1

A 2.5-inch magnetic recording medium substrate 1 (inner diameter 20 mm, outer diameter 65 mm, glass substrate having a layer comprising CoCrPtB on the surface as a magnetic layer) was set in place, and 22 mm diameter, disc-shaped holding members 2 and 3, with a taper angle of 60°, were caused to mate via the center hole of the magnetic recording medium substrate 1 to hold the magnetic recording medium substrate 1, which was accommodated within a case 7 as shown in FIG. 1. The holding members 2 and 3 were made of Teflon (a registered trademark); upon measuring the contact angle of water with the surface of the holding members, a value of 102° was obtained, confirming high water repellence. The holding member 3 was connected to the driving portion 5 via the rotation shaft 4.

As shown In FIG. 3, the magnetic recording medium substrate 1 was fixed in place and held by the contact face 2a of the cover of the holding member 2 by contact thereof with one face of the substrate 1, and by the contact face 3a of the cover of the holding member 3 by contact thereof with another face of the substrate 1. The holding members 2 and 3 were mated, and during high-speed rotation, sliding between the substrate 1 and the holding members 2 and 3 was prevented.

While rotating this magnetic recording medium substrate 1 by the procedure indicated below, resist liquid was dispensed from the nozzles 6 set within the case 7 onto the covers of the holding members 2, 3 at a radial position of 6 mm. The resist liquid moved from the edges of the holding members 2 and 3 onto the magnetic recording medium substrate 1, and so was simultaneously applied to both faces of the magnetic recording medium substrate 1. The resist liquid used was SOG resist manufactured by Tokyo Ohka Kogyo. In this practical example, the shape shown in FIG. 4 was used for mating.

Step 1: The magnetic recording medium substrate 1 was rotated for one second at a rotation rate of 500 rpm.

Step 2: While rotating the magnetic recording medium substrate 1 for five seconds at a rotation rate of 500 rpm, resist liquid was dispensed.

Step 3: After stopping dispensation of resist liquid, the rotation rate was raised from 500 rpm to 3000 rpm in one second.

Step 4: After maintaining a rotation rate of 3000 rpm for 20 second, rotation was stopped.

The resist film thickness after application was measured on each face at points at eight positions in the circumferential direction and three positions in the radial direction, for a total of 24 points, and was evaluated as uniform. An ellipsometer manufactured by Otsuka Denshi was used to perform film thickness measurements.

The average film thickness of the resist layer on the A face (the side of holding member 2) was 90 nm, and uniformity was excellent, with the film thickness within 2.2% of the average film thickness.

The average film thickness of the resist layer on the B face (the side opposite the A face) was 89 nm, and uniformity was excellent, with the film thickness within 2.2% of the average film thickness.

Further, upon using a reflection-type appearance analyzer device, an Optical Surface Analyzer manufactured by KLA-Tencor, to perform surface observations, no roughness or streaks were observed on either of the faces A and B.

Resist-free portions termed "unapplied portions" herein were maintained at radial positions from 10 mm to 11 mm. There was no penetration of resist liquid, and the width of the resist-free boundary region was within 0.1 mm.

Practical Example 2

As the magnetic recording medium substrate 1, a glass substrate, with inner diameter 20 mm and outer diameter 65 mm, and having on the surface a magnetic layer comprising CoCrPtB and a protective layer comprising carbon, was used. Resist layer formation was performed in all other respects similarly to that of Practical Example 1. The film thickness, uniformity, and surface observation results for the resist layer obtained were all similar to those of Practical Example 1, and the formation of the unapplied portions was also similar to that of Practical Example 1.

Comparative Example 1

Figure 8:
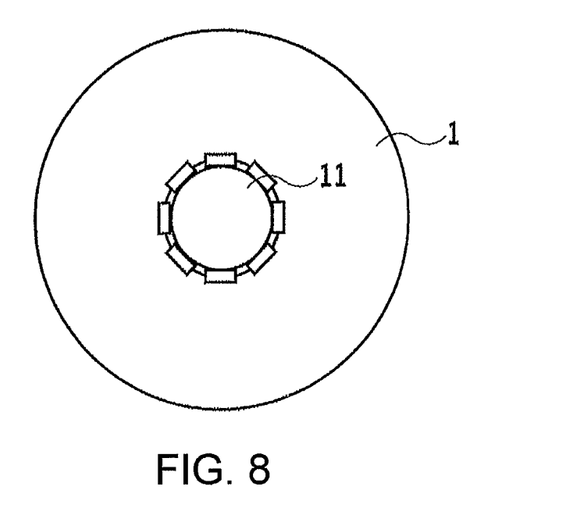
FIG. 8 is a summary view showing a state in which a substrate is held by a chuck used in the prior art, and used in Comparative Example 1.
Figure 9:
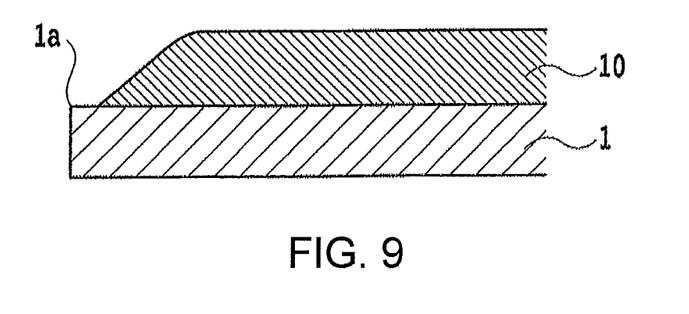
FIG. 9 shows the cross-sectional shape of the resist layer formed in Comparative Example 1.

Except for enclosing and holding the magnetic recording medium substrate 1 using a conventional chuck 11 as shown in FIGS. 8 and 9, and dispensing resist at a radial position of 11 mm, the resist liquid was applied simultaneously to both faces of the magnetic recording medium substrate 1 similarly to Practical Example 1.

Film thickness evaluations and observations of the surface of the resist layer were performed similarly to those of Practical Example 1.

The average film thickness of the resist layer on the A face (the side opposite the side with the rotation shaft) was 86 nm, and the film thickness was within 10.4% of the average film thickness. The average film thickness of the resist layer on the B face (the side with the rotation shaft) was 87 nm, and the film thickness was within 9.2% of the average film thickness.

Further, upon observing the surfaces on which the resist layers were formed, striations extending from the inner-periphery chuck to the outer periphery were seen on both the A and B faces.

The resist-free, unapplied portions could not be formed precisely because resist liquid had penetrated into the inner-periphery chuck and because of re-adhesion due to rebounding of resist liquid. The width of the boundary region was approximately 1.8 mm. Also, particles were formed from resist which had re-adhered to the chuck portion.

Reference Example 1

Except for the fact that the holding member material was aluminum, holding members with the same dimensions as the holding members used in Practical Example 1 were employed, and resist liquid was applied simultaneously to both faces of a magnetic recording medium substrate 1 having magnetic layers on the surfaces, similarly to Practical Example 1. Upon dripping water onto the surfaces of the holding members of aluminum and measuring the water contact angle, the angle was 67°, and no water repellence was observed.

Film thickness evaluations and surface evaluations of the resist layer thus formed were performed similarly to Practical Example 1. The average film thickness of the resist layer on the A face (the side of holding member 2) was 93 nm, and the film thickness was within 9.9% of the average film thickness. The average film thickness on the B face (the side opposite the A face) was 90 nm, and the film thickness was within 8.2% of the average film thickness.

Upon observing the surface of the resist layer thus obtained, striations extending from the inner-periphery of the center hole to the outer periphery of the substrate were seen both on the A and B faces. The unapplied portions could not be formed precisely because resist liquid had penetrated into the inner-periphery of the center hole, and because of re-adhesion due to rebounding of resist liquid. The width of the boundary region was approximately 1.2 mm. Also, when the holding members were removed from the substrate, resist adhering to the holding members was stretched, and flash was formed on the inner-periphery of the resist layers. Also, particles were formed from resist which had re-adhered to the holding members.

Reference Example 2

Except for the fact that the holding member taper angle was changed to 0°, resist liquid was applied simultaneously to both substrate faces in a manner similar to that of Practical Example 1.

Similarly to Practical Example 1, film thickness evaluations and surface observations of the resist layers obtained were performed. The average film thickness of the resist layer on the A face (the side of holding member 2) was 91 nm, and the film thickness was within 3.3% of the average film thickness. The average film thickness of the resist layer on the B face (the side opposite the A face) was 88 nm, and the film thickness was within 4.5% of the average film thickness.

Because the resist liquid could not spread smoothly from the holding members, roughness was observed at the inner-periphery portions on both the A and B faces. The resist-free unapplied portions were formed at radial positions from 10 mm to 11 mm. There was no penetration of resist liquid and the boundary region width was within 0.8 mm.

Figure 7:
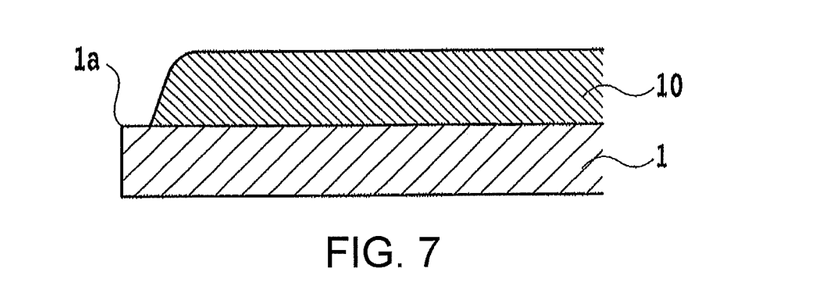
FIG. 7 shows the cross-sectional shape of a resist layer formed in an application process in a method of manufacturing a magnetic recording medium of this invention.

Upon comparison with the resist layer cross-sectional shape (FIG. 7) at the inner-periphery portion of the magnetic recording medium substrate 1 obtained in Practical Example 1, the inner-periphery portion of the resist layer was thinner in this reference example, as shown in FIG. 9. Hence the uniformity of the resist layer at the inner periphery was inferior to that of Practical Examples 1 and 2, and the pattern at the inner-periphery portion after performing imprinting could not be transferred as precisely as in Practical Examples 1 and 2.

From the above, it is seen that by means of a method of manufacturing a magnetic recording medium according to this invention, the resist-free unapplied portions can be formed precisely, so that the occurrence of roughness and flash at the resist layer inner-periphery portions near the inner, center, hole of the substrate, as well as the occurrence of particles due to re-adherence of resist liquid, could be prevented. Further, the resist layer can be formed with good precision at the inner-periphery portions, so that the transfer precision of imprinting at the inner-periphery portions near the inner, center, hole of the substrate can be improved.

While the present invention has been described in conjunction with embodiments and variations thereof, one of ordinary skill, after reviewing the foregoing specification, will be able to effect various changes, substitutions of equivalents and other alterations without departing from the broad concepts disclosed herein. It is therefore intended that Letters Patent granted hereon be limited only by the definition contained in the appended claims and equivalents thereof.

What is claimed is:

1. A method of manufacturing a magnetic recording medium, comprising the steps of:
   providing a substrate that is a magnetic recording medium substrate having a disc shape, having two main surfaces, and having defined therein a center hole;
   supporting the center hole of the substrate from both main surfaces with two holding members so as to hold the substrate in a vertical plane and to cover at least the periphery of the center hole adjacent to the two main surfaces of the substrate, the two holding members each having a circumferential tapered portion that tapers down toward a circumferential perimeter of the substrate, the tapered portions of the holding members being symmetrical with respect to the vertical plane;
   engaging one of the two holding members with a rotation shaft of a drive portion of a spin coater and detachably mating the two holding members with one another at the rotation shaft, wherein one of the holding members has a lateral protrusion and the other holding member has a depression portion that interlocks with the protrusion to prevent relative rotation of the two holding members, wherein a rotational axis of the holding members passes through the protrusion and the depression; and
   applying resist liquid simultaneously to both main surfaces of the substrate using spin coating to form a resist layer simultaneously on both main surfaces by directing resist liquid toward the tapered portions of each of the two holding members while maintaining the periphery of the center hole immediately adjacent to the two main surfaces of the substrate substantially resist-free,
   wherein the applying steps is conducted by directing the resist liquid toward locations on the tapered portions that are substantially equally distant from the rotational axis.

2. The method of manufacturing a magnetic recording medium according to claim 1, wherein the two holding members each have at least one surface that has water-repellent properties.

3. The method of manufacturing a magnetic recording medium according to claim 2, wherein the center hole of the substrate is closed by at least one of the two holding members.

4. The method of manufacturing a magnetic recording medium according to claim 1, wherein the center hole of the substrate is closed by at least one of the two holding members.

5. The method of manufacturing a magnetic recording medium according to claim 1, wherein the magnetic recording medium substrate provided includes a magnetic layer or a magnetic layer and a protective layer formed on the magnetic layer.

6. The method of manufacturing a magnetic recording medium according to claim 1, wherein applying resist using spin coating is performed by holding the main surfaces of the substrate vertically during spinning and supplying resist liquid to the main surfaces of the substrate from a substantially horizontal direction.

7. A method of manufacturing a magnetic recording medium according to claim 1,
   wherein each of the holding members includes a disc-shaped portion and has at least one surface that has water-repellent properties.

8. The method of manufacturing a magnetic recording medium according to claim 7, wherein the center hole of the substrate is closed by at least one of the two holding members.

9. The method of manufacturing a magnetic recording medium according to claim 7, wherein applying resist using spin costing is performed by holding the substrate vertically during spinning and supplying resist liquid by directing resist liquid toward each of the two holding members from a horizontal direction.

10. The method of manufacturing a magnetic recording medium according to claim 7, wherein the magnetic recording medium substrate provided includes a magnetic layer or a magnetic layer and a protective layer formed on the magnetic layer.

11. A method of manufacturing a magnetic recording medium, comprising the steps of:
    providing a substrate that is a magnetic recording medium substrate having a disc shape, having two main surfaces, and having defined therein a center hole;
    supporting the center hole of the substrate from both main surfaces with two holding members that hold the substrate in a vertical plane and cover at least the periphery of the center hole adjacent to the two main surfaces of the substrate, the two holding members each having a circumferential tapered portion that tapers down toward a circumferential perimeter of the substrate and each having at least one surface that has water-repellent properties, and at least one of the two holding members closing the center hole; and
    engaging one of the two holding members with a rotation shaft of a drive portion of a spin coater and detachably mating the two holding members with one another at the rotation shaft, wherein one of the holding members has a protrusion and the other holding member has a depression portion that interlocks with the protrusion to prevent relative rotation of the two holding members, wherein a rotational axis of the holding members passes through the protrusion and the depression; and
    applying resist liquid using spin coating simultaneously to both main surfaces of the substrate by spinning the substrate and by directing resist liquid toward the tapered portions of each of the two holding members from a horizontal direction to form a resist layer simultaneously on both main surfaces while maintaining the periphery of the center hole immediately adjacent to the two main surfaces of the substrate substantially resist-free, wherein the tapered portions of the holding members are symmetrical with respect to the vertical plane, and wherein the resist liquid is applied at locations on the tapered portions that are substantially the same distance from the rotation axis of the holding members.

12. The method of manufacturing a magnetic recording medium according to claim 11, wherein the two holding members have surfaces that have water-repellent properties.

13. The method of manufacturing a magnetic recording medium according to claim 12, wherein the two holding members are made of polytetrafluoroethylene.

14. The method of manufacturing a magnetic recording medium according to claim 11, wherein the magnetic recording medium substrate includes a magnetic layer or a magnetic layer and a protective layer formed on the magnetic layer.

15. A method for manufacturing a magnetic recording medium, comprising the steps of:
 (a) providing a disk-shaped substrate that is a magnetic recording medium substrate having first and second sides and having a center hole;
 (b) using first and second holding members to support the substrate in a vertical plane so that the substrate is rotatable about an axis that is perpendicular to the vertical plane and that passes through the middle of the center hole of the substrate, the first holding member having a first tapered portion that is disposed adjacent the first side of the substrate and the second holding member having a second tapered portion that is disposed adjacent the second side of the substrate, the first tapered portion and the second tapered portion being symmetrical with respect to the vertical plane; and
 (c) applying liquid resist to the first tapered portion at a location that is a first distance from the axis about which the substrate rotates; and
 (d) while step (c) is being conducted, applying liquid resist to the second tapered portion at a location that is a second distance from the axis about which the substrate rotates, wherein the first distance is substantially the same as the second distance.

16. A method for manufacturing a magnetic recording medium according to claim 15, wherein the first holding member has a depression and the second holding member has a protrusion that fits into the depression, so as to detachably interlock the holding members.

17. A method for manufacturing a magnetic recording medium according to claim 15, wherein the first and second tapered portions have water-repellent properties.

18. A method for manufacturing a magnetic recording medium according to claim 17, wherein the first and second holding members are made of polytetrafluoroethylene.

19. A method for manufacturing a magnetic recording medium according to claim 15, wherein the first and second holding members have outer peripheries that are circular and that have a common diameter, and wherein the center hole of the substrate is circular and has a diameter that is smaller than the common diameter of the holding members, so that the holding members shield the first and second sides of the substrate from the resist liquid at annular regions of the first and second sides adjacent the hole in the substrate.

* * * * *